(12) United States Patent
Moreau-Gobard (10) Patent No.: US 7,233,329 B2
(45) Date of Patent: Jun. 19, 2007

(54) RENDERING FOR CORONARY VISUALIZATION

(75) Inventor: Romain Moreau-Gobard, Princeton, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 247 days.

(21) Appl. No.: 10/978,654

(22) Filed: Nov. 1, 2004

(65) Prior Publication Data

US 2005/0093861 A1    May 5, 2005

Related U.S. Application Data

(60) Provisional application No. 60/516,953, filed on Nov. 3, 2003.

(51) Int. Cl.
*G06T 17/00* (2006.01)

(52) U.S. Cl. .................................. 345/424; 382/128
(58) Field of Classification Search ................ 345/424; 382/128
See application file for complete search history.

(56) References Cited

U.S. PATENT DOCUMENTS 6,058,218 A    5/2000    Cline

FOREIGN PATENT DOCUMENTS

WO    WO 2005/011500 A1    2/2005

OTHER PUBLICATIONS

Kanitsar et al., Computed Tomography Angiography: A Case Study of Perpheral Vessel Investigation, Oct. 2001, pp. 477-480 and 593.*
Flroin C et al, "Automatic Heart Peripheral Vessels Segmentation Based on a Normal MIP Ray Casting Technique", *Medical Image Computing and Computer-Assisted Intervention—MICCAI2004*, 7th International Conference Proceedings, Springer-Verlag Berlin, Germany, vol. 1, 2004, pp. 483-490.

(Continued)

*Primary Examiner*—Almis R. Jankus
(74) *Attorney, Agent, or Firm*—Donald B. Peschburg; F. Chau & Associates, LLC (57) ABSTRACT

A system and corresponding method for organ rendering are provided, where the system includes a processor, an imaging adapter in signal communication with the processor for receiving organ scan data indicative of an organ, a segmentation unit in signal communication with the processor for segmenting an outer surface of the organ, and a ray-casting unit in signal communication with the processor for providing a maximum intensity projection substantially normal to the segmented outer surface for each of a plurality of rays, and for forming a ray collection by casting each of the plurality of rays from a center of the organ through the respective projection to the segmented outer surface; and where the method includes segmenting an outer surface of an organ, providing a maximum intensity projection substantially normal to the segmented outer surface for each of a plurality of rays, and forming a ray collection by casting each of the plurality of rays from a center of the organ through the respective projection to the segmented outer surface.

21 Claims, 8 Drawing Sheets

OTHER PUBLICATIONS

Lavi G A, "Mapping the Coronary Arteries on a Sphere in CT Angiography", Proceedings of the SPIE—The International Society for Optical Engineering, vol. 5367, No. 1, May 25, 2004, pp. 285-293.

Guo J et al, "Rendering the Unfolded Cerebral Cortex", *Medical Image Computing and Computer-Assisted Intervention*, MICCAI 99, International Conference, Sep. 19-22, 1999; pp. 287-296.

Etienne A et al, "'Soap-Bubble' Visualization and Quantitative Analysis of 3D Coronary Magnetic Resonance Angiograms", *Magnetic Resonance in Medicine*, Wiley, USA, vol. 48, No. 4, Oct. 2002, pp. 658-666.

Search Report (including Notification of Transmittal of the International Search Report, International Search Report, and Written Opinion of the International Searching Authority).

* cited by examiner

RENDERING FOR CORONARY VISUALIZATION

CROSS-REFERENCE TO RELATED APPLICATION

This application claims the benefit of U.S. Provisional Application Ser. No. 60/516,953 filed Nov. 3, 2003 and entitled "High Quality Normal-MIP Rendering for Coronary Visualization", which is incorporated herein by reference in its entirety.

BACKGROUND

Medical image scanning data, for example, is typically obtained in the form of slices in various types of imaging modalities. These slices are then stacked to form a three-dimensional (3D) volume. It is desirable to visualize and segment the volume.

In current approaches to medical image scanning, researchers have developed a wide variety of segmentation techniques for isolating heart coronary arteries. Research in this field is motivated by the high number of patients suffering from coronary artery disease. Heart coronary arteries are typically difficult to segment because of their size and proximity to the surface of the heart and blood pool.

Accordingly, what is needed is a system and method capable of Rendering for Coronary Visualization. The present disclosure addresses these and other issues.

SUMMARY

These and other drawbacks and disadvantages of the prior art are addressed by a system and method of rendering for coronary visualization.

A system of organ rendering for coronary visualization includes a processor, an imaging adapter in signal communication with the processor for receiving organ scan data indicative of an organ, a segmentation unit in signal communication with the processor for segmenting an outer surface of the organ, and a ray-casting unit in signal communication with the processor for providing a maximum intensity projection substantially normal to the segmented outer surface for each of a plurality of rays, and for forming a ray collection by casting each of the plurality of rays from a center of the organ through the respective projection to the segmented outer surface.

A corresponding method of organ rendering for coronary visualization includes segmenting an outer surface of an organ, providing a maximum intensity projection substantially normal to the segmented outer surface for each of a plurality of rays, and forming a ray collection by casting each of the plurality of rays from a center of the organ through the respective projection to the segmented outer surface.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method of Rendering for Coronary Visualization, in accordance with the following exemplary figures, in which.

DETAILED DESCRIPTION OF PREFERRED EMBODIMENTS

In accordance with preferred embodiments of the present disclosure, a system and method of Rendering for Coronary Visualization are described herein. The method allows a user to better visualize the heart coronaries and vessels near the surface of the heart. This method is used to compute a very high quality rendering of the heart coronaries. To achieve this, rays are cast from the center of the heart to the surface on a thick slab of the heart's surface. Then, a maximum intensity projection (MIP) is computed for all of the rays. The resulting rendering is called a "normal-MIP" because all rays are substantially perpendicular or normal to the general surface of the heart. The present disclosure describes the steps needed to build a high quality rendering of the coronary tree.

Researchers have developed a wide variety of segmentation techniques for isolation and visualization of heart coronary arteries. Research in this field is motivated by the high number of patients suffering from coronary artery disease. Heart coronary arteries are typically difficult to visualize because of their size and proximity to the surface of the heart and blood pool. Furthermore, the proximity of pulmonary arteries obstructs the heart's surface, where the coronary arteries lie.

Because of the difficulty with segmentation, and because of the proximity of coronary arteries to the surface of the heart, a surface unfolding approach can be used to address the visualization problem. This technique provides an improvement for visualization of the heart coronary arteries. The presently disclosed method includes "unfolding" the surface of the heart and creating a maximum intensity projection (MIP) of this surface. The result is a two-dimensional (2D) map of the surface of the heart, containing the peripheral vessels, which is easier to read for the cardiologists.

Figure 1:
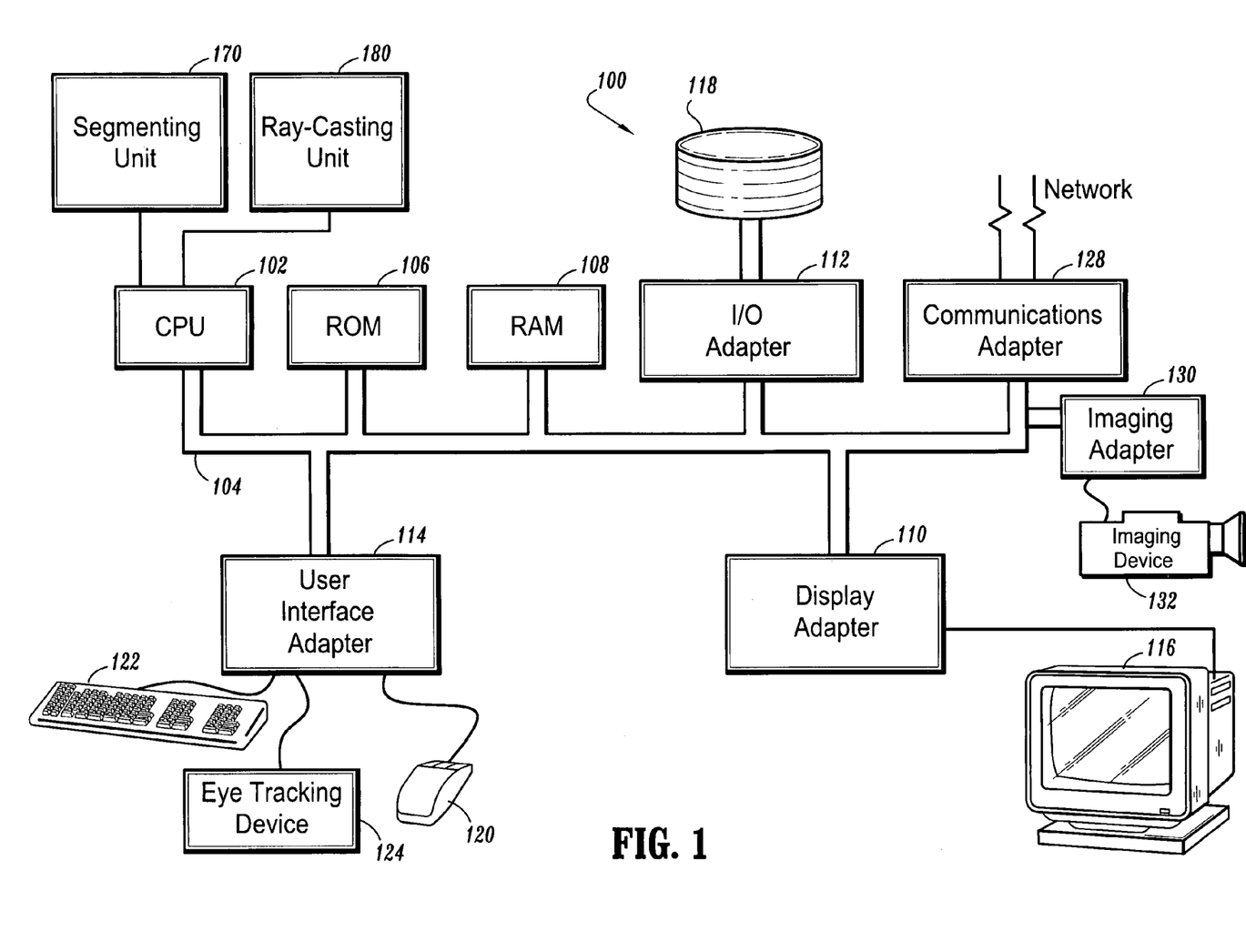
FIG. 1 shows a schematic diagram of a system disposed to Rendering for Coronary Visualization in accordance with an illustrative embodiment of the present disclosure.

As shown in FIG. 1, a system of rendering for coronary visualization according to an illustrative embodiment of the present disclosure is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. A magnetic resonance imaging device 132 is in signal communication with the system bus 104 via the imaging adapter 130.

A segmentation unit 170 and a ray-casting unit 180 are also included in the system 100 and in signal communication with the CPU 102 and the system bus 104. While the segmentation unit 170 and the ray casting unit 180 are illustrated as coupled to the at least one processor or CPU 102, these components are preferably embodied in computer program code stored in at least one of the memories 106, 108 and 118, wherein the computer program code is executed by the CPU 102. As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the segmentation unit 170 and the ray casting unit 180, as well as the other elements of the system 100, while practicing within the scope and spirit of the present disclosure.

Figure 2:
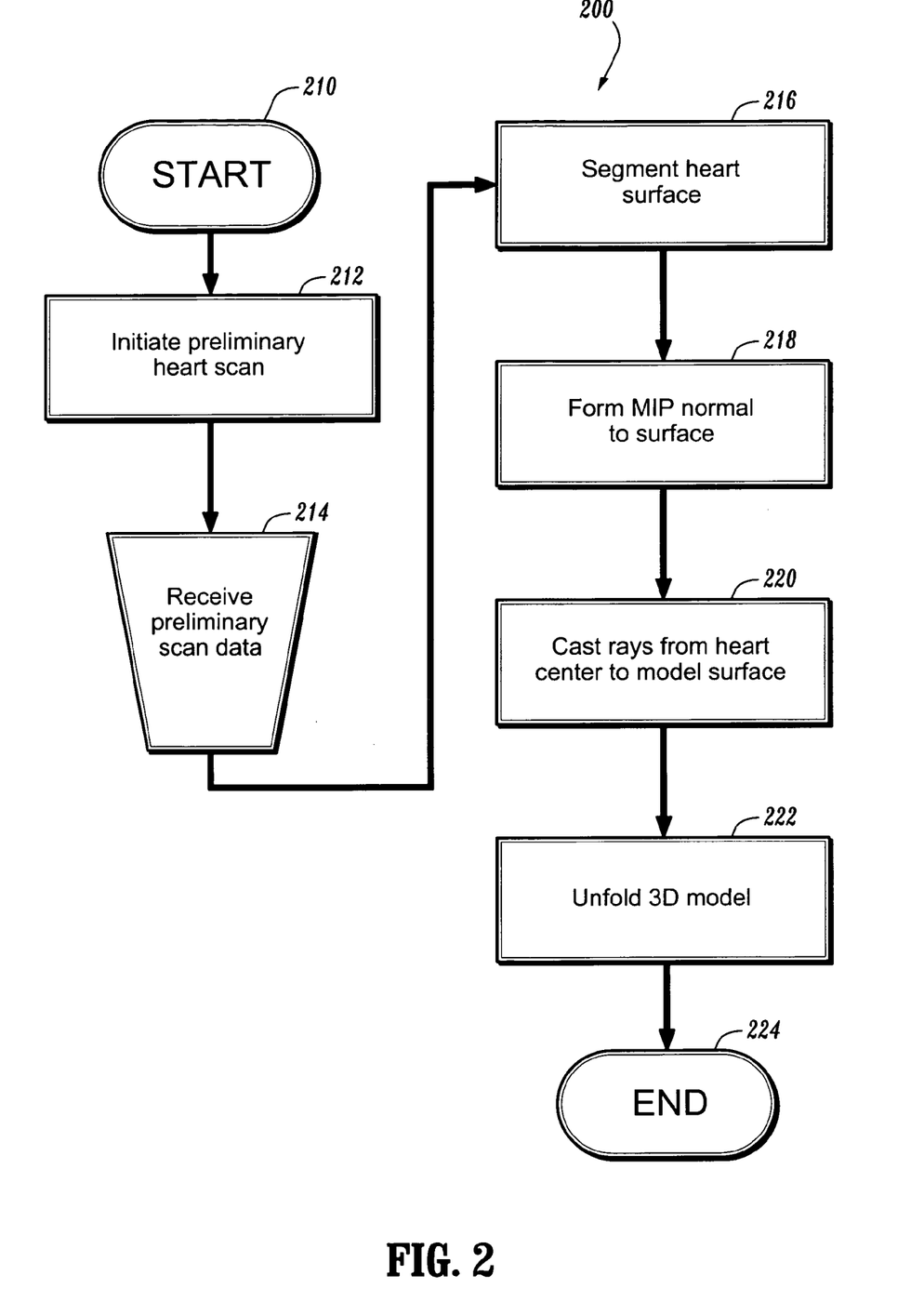
FIG. 2 shows a flow diagram of a method disposed to Rendering for Coronary Visualization in accordance with an illustrative embodiment of the present disclosure.

Turning to FIG. 2, a flowchart of rendering for coronary visualization according to an illustrative embodiment of the present disclosure is indicated generally by the reference numeral 200. The flowchart 200 includes a start block 210 that passes control to a function block 212. The function block 212 initiates a preliminary heart scanning session and passes control to an input block 214. The input block 214 receives preliminary heart scan data and passes control to a function block 216.

The function block 216 segments the heart's outer surface and passes control to a function block 218. The function block 218 performs a maximum intensity projection (MIP) substantially normal to the segmented outer surface for a number of rays, and passes control to a function block 220. The function block 220 forms a ray collection by casting each of the rays from a center of the organ through the respective MIP to the segmented outer surface, and passes control to a function block 222. The function block 222 unfolds the 3D model and passes control to an end block 224.

Figure 3:
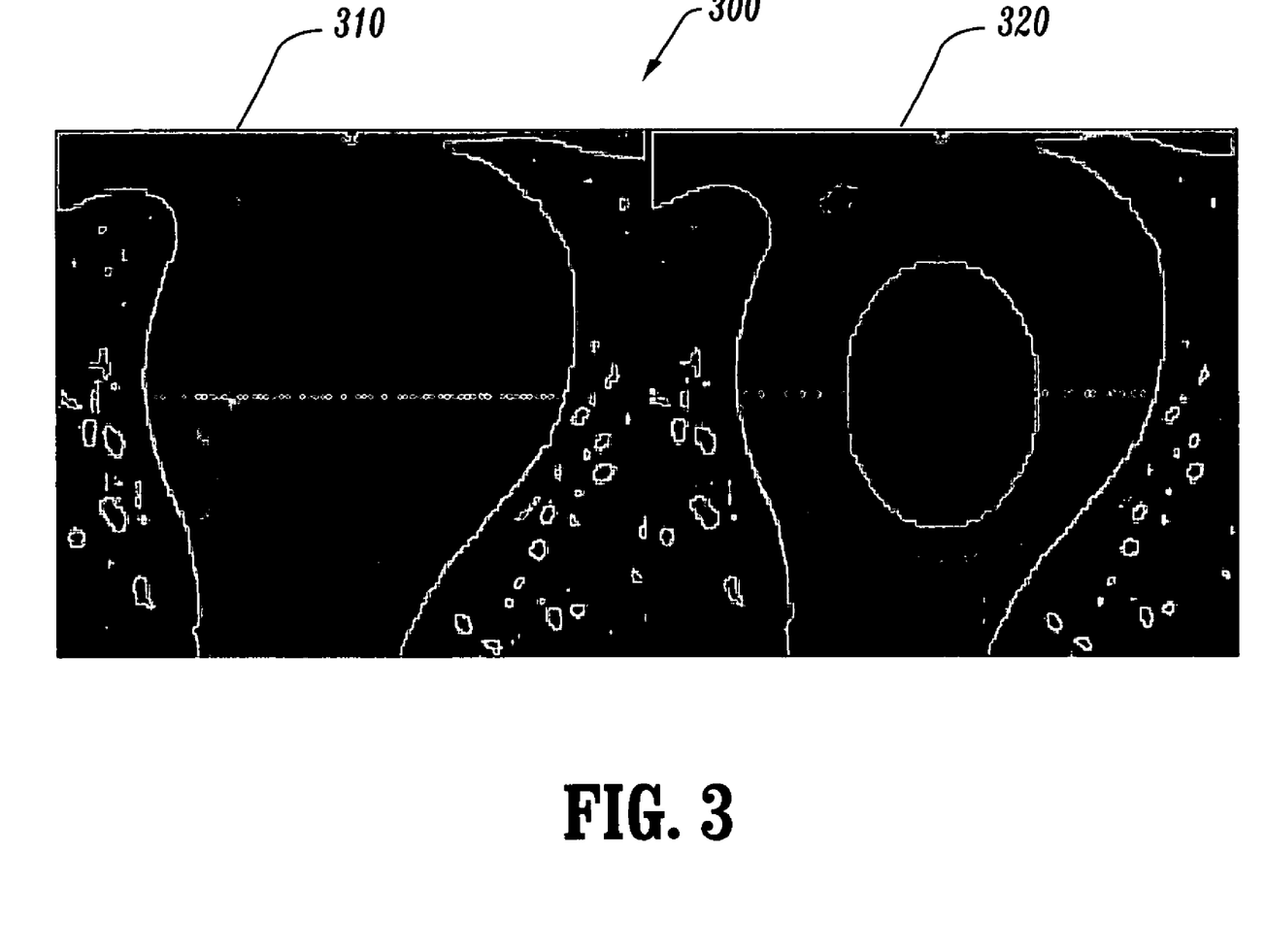
FIG. 3 shows a graphical diagram of computed segmentations in accordance with an illustrative embodiment of the present disclosure.

Turning now to FIG. 3, segmentations are indicated generally by the reference numeral 300. The segmentations include a before segmentation 310 and an after segmentation 320 that were obtained using the graph cut algorithm with a single seed point in the heart.

Figure 4:
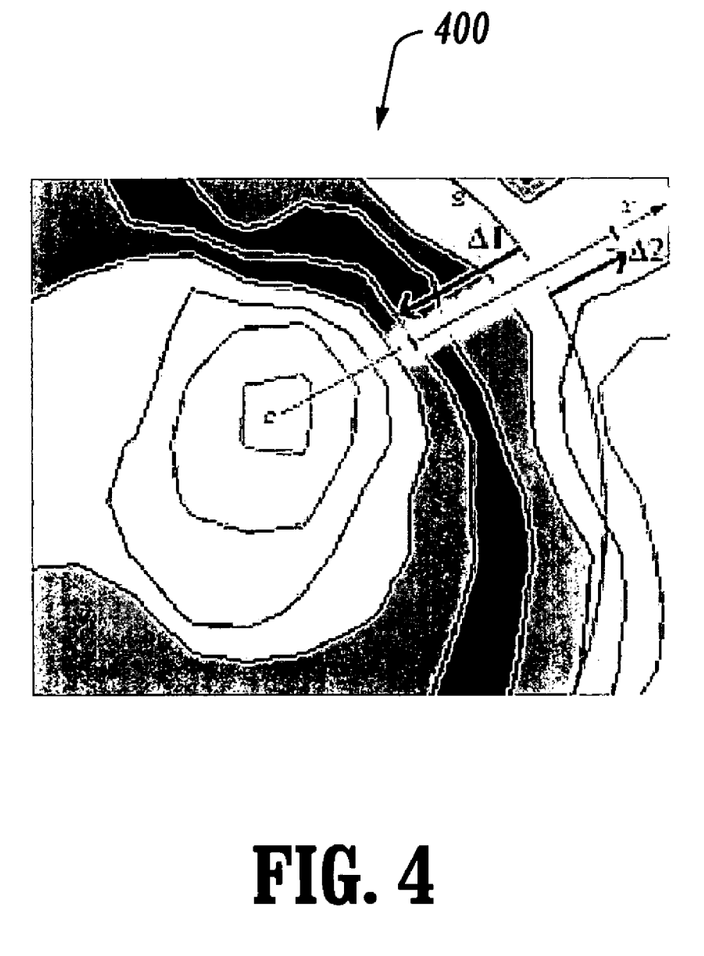
FIG. 4 shows a graphical diagram of a distance map in accordance with an illustrative embodiment of the present disclosure.

As shown in FIG. 4, a distance map is indicated generally by the reference numeral 400. The distance map 400 indicates the ray (r), as well as the inside and outside distances (D1, D2) from the center (c). Each value (x, y, z) on the 3D distance map 400 is the distance from the voxel to the surface of the heart.

Figure 5:
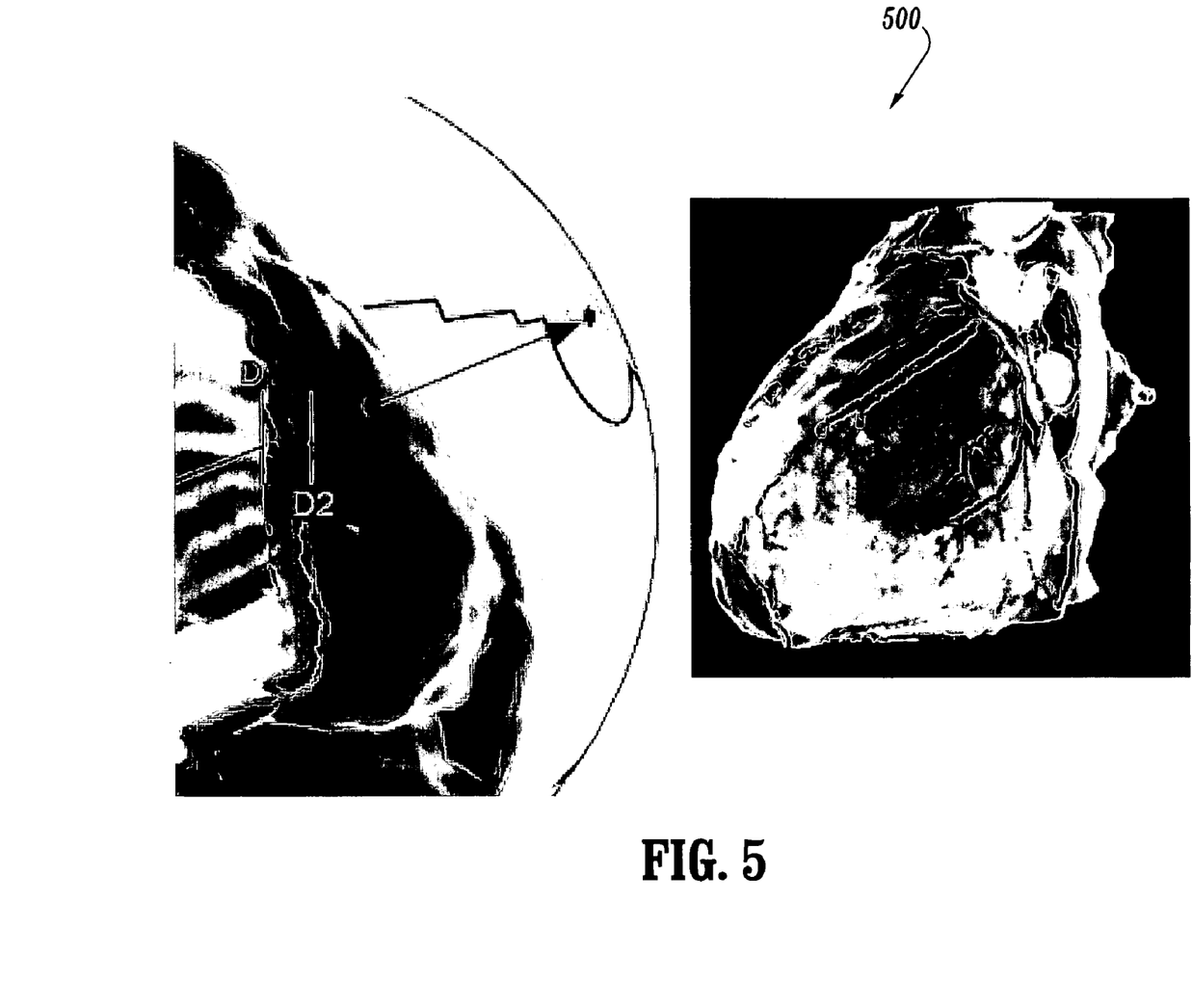
FIG. 5 shows a graphical diagram of a maximum intensity projection (MIP) displayed on a three-dimensional (3D) isosurface model in accordance with an illustrative embodiment of the present disclosure.

Turning to FIG. 5, an isosurface model is indicated generally by the reference numeral 500. Here, the image resulting from ray casting is displayed directly in 3D as a texture on the isosurface.

Figure 6:
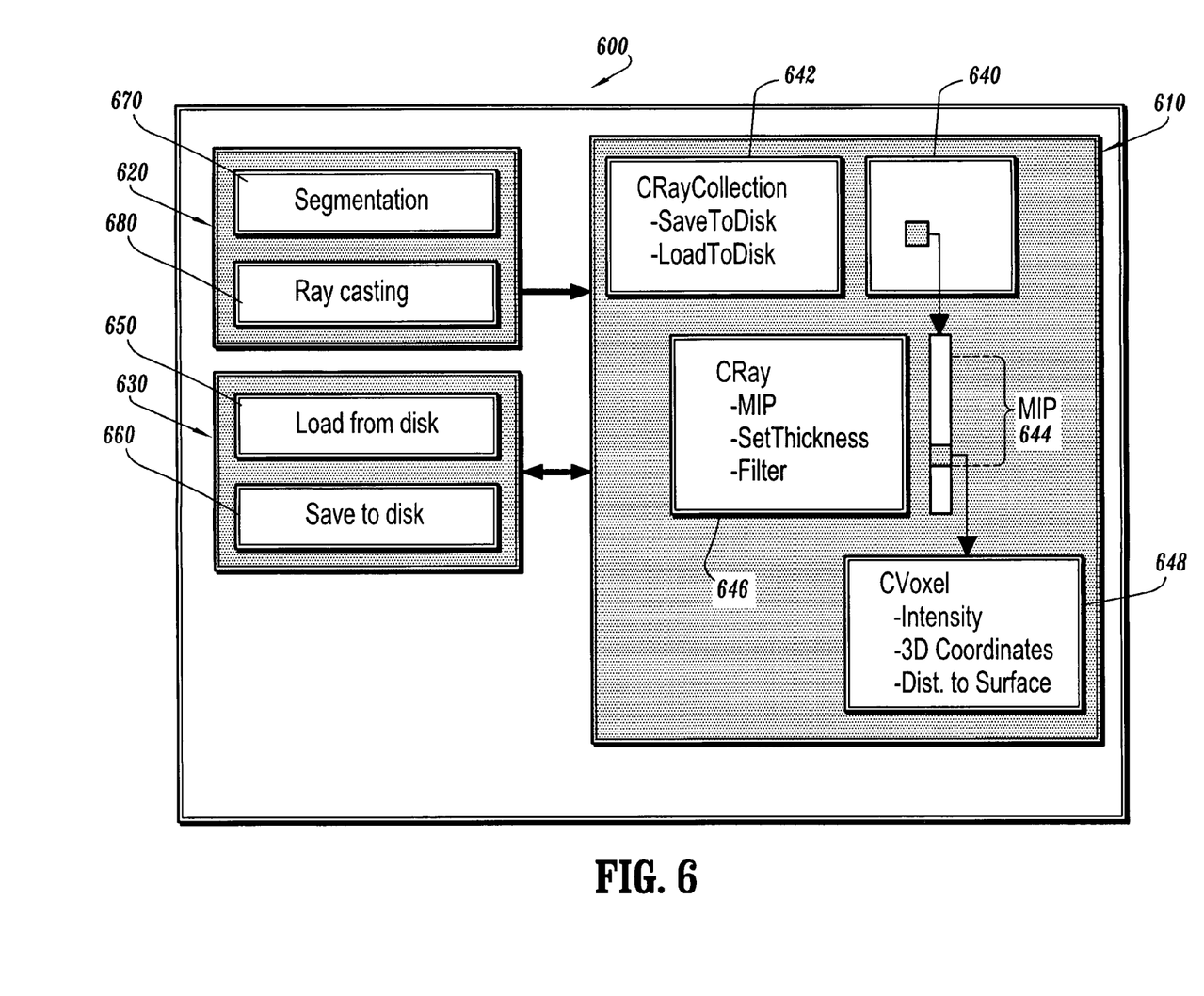
FIG. 6 shows a schematic diagram for building a ray collection in accordance with an illustrative embodiment of the present disclosure.

Turning now to FIG. 6, a ray collection unit is indicated generally by the reference numeral 600. The ray collection unit 600 includes a ray handling unit 610, a segmentation/casting unit 620 and a disk input/output unit 630. The ray handling unit 610 includes a ray collection portion 640, a ray collection control portion 642, a maximum intensity projection (MIP) portion 644, a ray control portion 646, and a voxel portion 648. The segmentation/casting unit 620 includes a segmentation unit 670 and a ray casting unit 680, while the disk input/output unit 630 includes a loading unit 650 and a saving unit 660. The ray collection unit builds a ray collection by creating a data structure containing the voxels for each ray. The data structure, in turn, is used for fast interaction, such as changing the MIP thickness, as well as for further vessel detection. In this exemplary internal data structure, the current ray collection 640 could contain 400×400×40 elements, for example.

Figure 7:
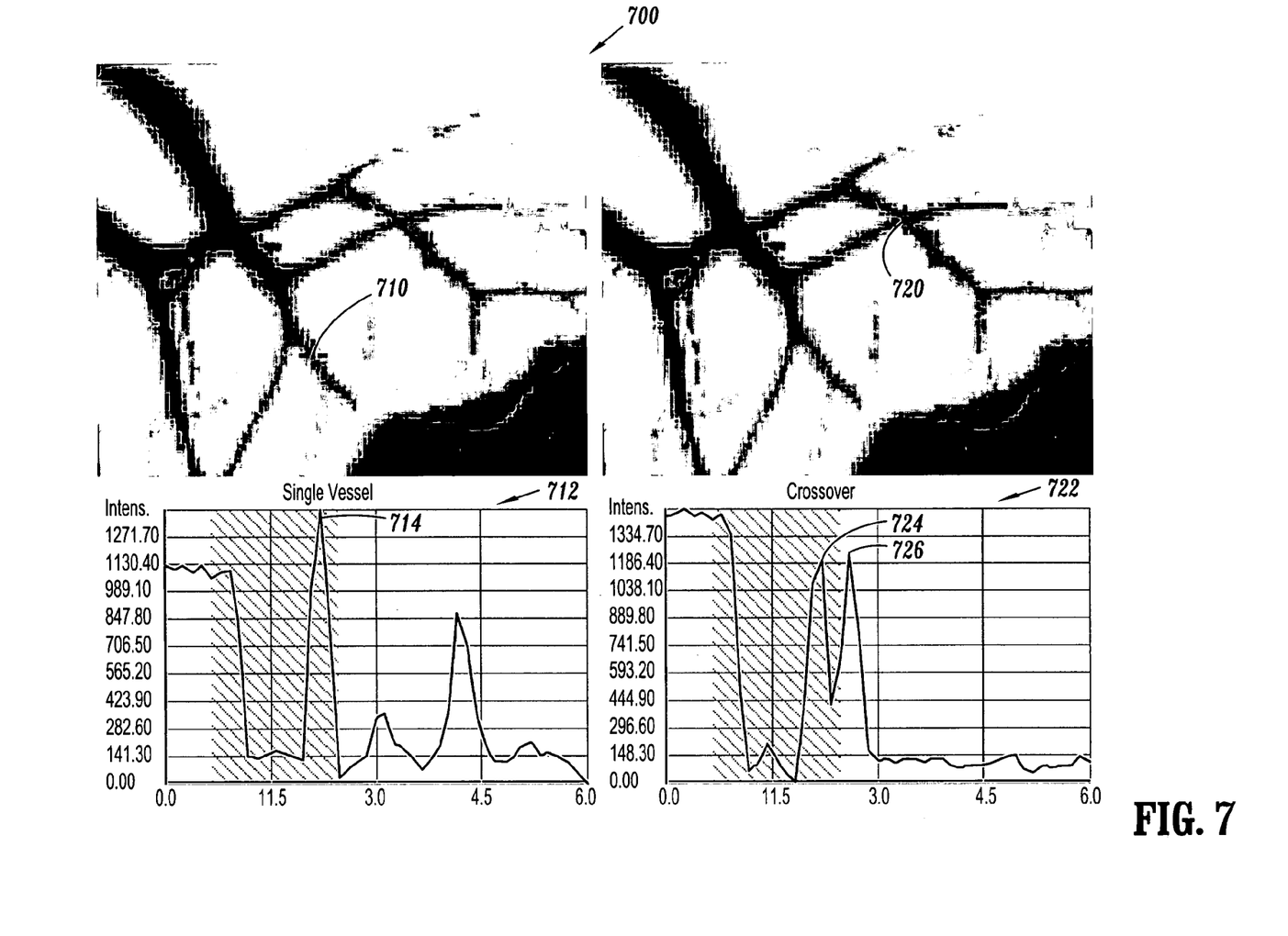
FIG. 7 shows a graphical diagram for analyzing a ray collection in accordance with an illustrative embodiment of the present disclosure.

As shown in FIG. 7, a ray collection analysis is indicated generally by the reference numeral 700. The analysis 700 includes a single vessel 710 and a crossover 720. A profile curve 712 for the single vessel 710 shows a single intensity peak 714, while a profile curve 722 for the crossover 720 shows dual intensity peaks 724 and 726 for first and second vessels, respectively. The ray collection is analyzed by analyzing the profile curve for each ray, and looking for known patterns. While the points of interest may be selected from an unfolded texture, the exact 3D locations are known for each voxel on the profile curves.

Figure 8:
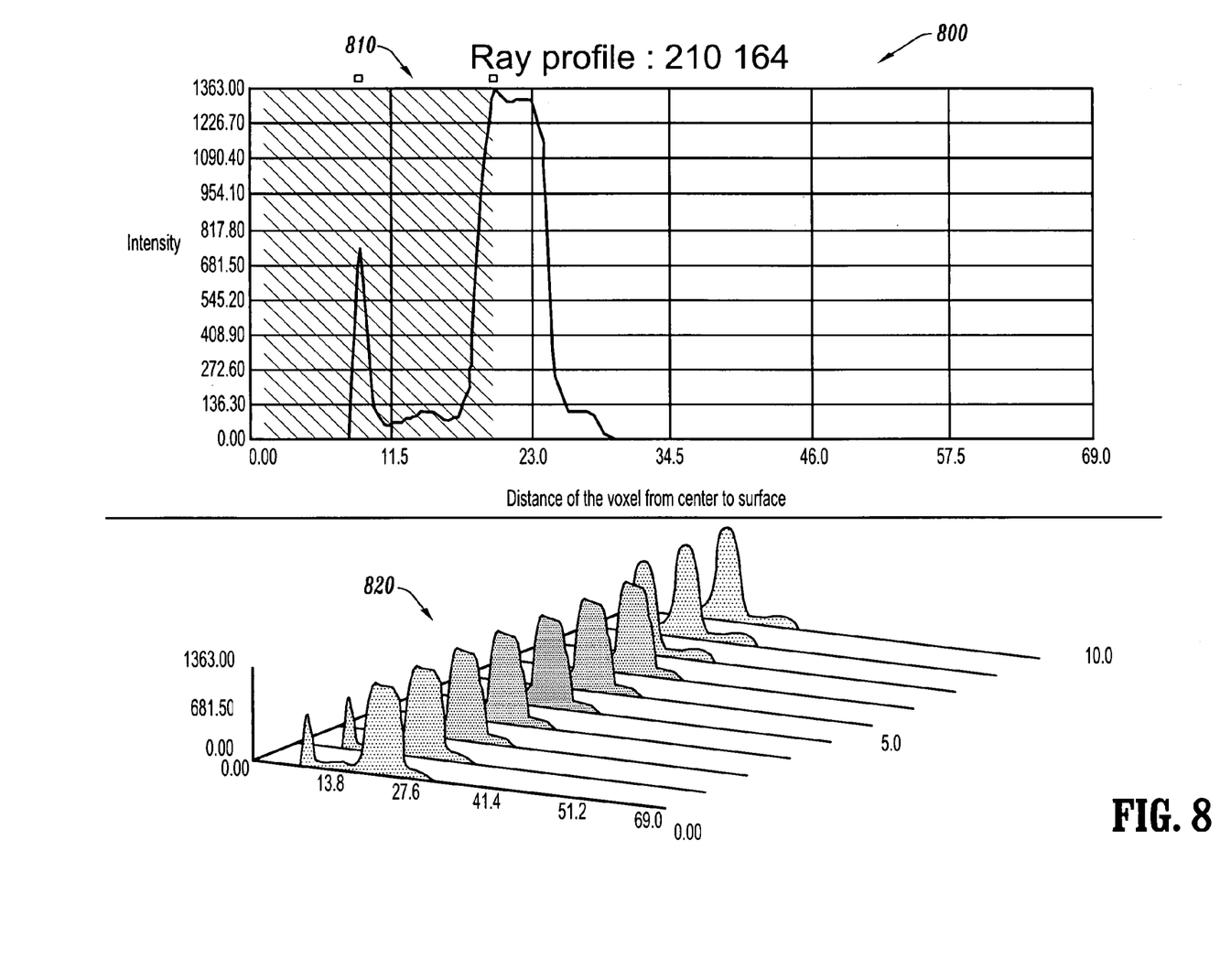
FIG. 8 shows a graphical diagram for filtering a ray collection in accordance with an illustrative embodiment of the present disclosure.

Turning to FIG. 8, a ray collection filtering is indicated generally by the reference numeral 800. The filtering 800 includes a ray profile 810 and a vessel tracking plot 820. Rays are filtered by finding the local maximum on each ray and analyzing the slopes and intensites to obtain a first set of points. 3D point clouds of the filtered points are provided.

In operation of the method 200 of FIG. 2, an exemplary embodiment uses the following technique for isolation of the surface of the heart. In order to compute a normal MIP, the heart's surface is identified and then a 3D distance map is built. A 3D graph cut algorithm, as known to those of ordinary skill in the pertinent art, may be used to crop the heart data. The result of this isolation is to define a clear boundary between the myocardium and the rest of the volume.

The segmentation algorithm outputs a 3D mask, which will be converted to a 3D distance map in the next step. Note that the quality of the final image does not depend on the result of the segmentation itself at some degree, which makes this technique highly robust. In addition, other methods can be used in the step to isolate the heart, such as model-based segmentation, for example.

In operation with reference to the segmentations 300 of FIG. 3, computation of the distance map may be accomplished from the 3D mask. The distance map may be used both to compute the thickness of the MIP and to get the normal vector to any point on the surface, as shown below by the pseudo-code listing of Table 1.

TABLE 1

```
// Initialization of the distance map
for each voxel
    for n = 14 different directions (6 axial + 8 diagonal)
        Get mask value in direction n
        if on edge
            distance = distance to edge;
        distance_map[voxel] = distance;
// First pass
for each voxel from start to end
    temp = distance_map[voxel];
    for (n=1; n<14; n+=2)
        temp = min(temp, "delta modulus" +
distance_map[voxel+delta])
        distance_map[voxel] = temp;
}
// Second pass (in the opposite order)
for each voxel from end to start
{
    temp = distance_map[voxel];
    for (n=0; n<14; n+=2)
        temp = min(temp, "delta modulus" +
distance_map[voxel+delta])
        distance_map[vInd] = temp;
}
```

In operation with reference to the distance map 400 of FIG. 4, once the distance map is obtained, rays are cast for each voxel of the surface. Each ray is defined by the vector perpendicular to the surface and a predefined range. The voxel of maximum intensity along the ray is displayed on the surface of the heart. For each voxel on the surface of the heart, where typically the distance map value is zero, the normal vector is computed by either using the center point (c) or by using the gradient of the distance map at the voxel coordinates. For each incremental distance inside the heart, ray coordinates are computed as r equals n1 times normal vector, and the intensity at each ray coordinate is stored. In addition, for each incremental distance outside the heart, ray coordinates are computed as r equals n2 times normal vector and the intensity at each ray coordinate is stored. A maximum intensity projection (MIP) is computed for the ray by reading the voxel of maximum intensity between D1 and D2, and the MIP for the current ray is displayed. The resulting image can then be displayed in 3D, directly as a texture on the isosurface.

Embodiments of the present disclosure offer coronary isolation with improved quality of the unfolded image and angiogram-style visualization, improved speed of the algorithms, segmentation with automatic coronary tree visualization, vessel viewing improvements, reduced blind spots, and useful orientations without distortion.

In operation of exemplary embodiments, a three-dimensional (3D) isolation is obtained from an unfolded view by segmenting the heart surface, and casting rays from the center to the surface. A ray collection is built by creating a structure containing the voxels for each ray. The structure may be used for fast interaction, such as changing the MIP thickness, and for further vessel detection. The ray collection is analyzed by analyzing the profile curve for each ray and looking for known patterns, where the exact 3D location is known for each voxel on the profile curve. The rays are filtered by obtaining the local maximum on each ray and analyzing the slopes and intensities to provide a first set of points. Concurrent points are adjusted and processed to better approximate the centerlines of the vessels, eliminate noise, and increase coherence between points on the same vessel. Points are adjusted in 3D with eigenvalues to help center the points and eliminate some of the noise.

The focus becomes increasing the density of points along the vessel in order to make the linking easier. A continuity filter is implemented for each point with a set of heuristics to create other points that are on the same vessel. The heuristics may include minimal distance between existing points, ridge detection, and/or a velocity vector of the previous points. One-click vessel detection is accomplished by linking all points with a similar direction in the same neighborhood from one seed point.

As will be recognized by those of ordinary skill in the pertinent art, alternate embodiments may detect two-dimensional (2D) centerlines of coronaries, separate arteries from veins, evaluate plaques for an unfolded view, detect calcium in an unfolded view, and/or separate pulmonary vessels.

This exemplary method brings an improved visualization technique for the heart coronaries, as well as vessels on the surface of the heart. One feature is to "unfold" the surface of the heart and create a MIP of this unfolded surface. The resulting 2D map of the surface of the heart contains highly contrasted vessels.

Thus, the exemplary technique used for unfolding the surface of the heart is accomplished in four steps: 1) Segmentation of the heart's outer surface; 2) Fixed 3D model parameterization of the heart; 3) Casting rays from the center of the heart to the surface of the 3D model, for which an MIP filter can be applied; and 4) Unfolding of the 3D model.

A graph cut algorithm as known in the art, for example, may be used to segment the outer surface of the heart. From the result of this segmentation, a distance map is created to evaluate the distance from each point on the volume to the segmented surface of the heart. Then, a known 3D model can be fit into the heart so that the surface of the heart fits the surface of the model. After this step, a ray is cast from the center of the heart to the surface of the 3D model. A profile curve is created while the ray propagates through the heart, and a response filter is applied to detect the eventual location of a vessel. If a location is found, then the algorithm displays the result on the surface of the 3D Model. As will be recognized by those of ordinary skill in the pertinent art, the unfolding of the 3D model is a widely studied problem and several different algorithms can be used.

A preferred embodiment uses a sphere as 3D model and maximum intensity projection (MIP) as the profile curve filter. Although alternate 3D models and ray filters may be used, some may adversely impact the quality of the results.

Thus, preferred embodiments of the present disclosure provide powerful heart unfolding tools for coronary isolation and visualization, enabling users to extract significant features and regions-of-interest. Preferred embodiments can serve as very useful acquisition-time modeling and automated post-processing tools in clinical applications.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method of organ rendering comprising:
   segmenting an outer surface of an organ;
   providing a maximum intensity projection (MIP) substantially normal to the segmented outer surface for each of a plurality of rays; and
   forming a ray collection by casting each of the plurality of rays from a center of the organ through the respective MIP to the segmented outer surface.

2. A method as defined in claim 1, further comprising unfolding a three-dimensional (3D) model of the organ into a two-dimensional (2D) image in correspondence with the substantially normal MIPs.

3. A method as defined in claim 1 wherein:
   the organ is a heart; and
   the substantially normal MIPs are indicative of features comprising coronary blood vessels.

4. A method as defined in claim 1, further comprising receiving preliminary organ scan data.

5. A method as defined in claim 2 wherein the 3D model is fixed.

6. A method as defined in claim 2 wherein the 3D model is selected from the group of 3D shapes consisting of a sphere, a cylinder and an ellipsoid.

7. A method as defined in claim 1 wherein casting rays comprises applying a maximum intensity projection filter to at least one ray.

8. An apparatus for organ rendering comprising:
   segmenting means for segmenting an outer surface of an organ;
   projecting means for providing a maximum intensity projection (MIP) substantially normal to the segmented outer surface for each of a plurality of rays; and
   collecting means for forming a ray collection by casting each of the plurality of rays from a center of the organ through the respective MIP to the segmented outer surface.

9. An apparatus as defined in claim 8, further comprising scanning means for receiving organ scan data.

10. An apparatus as defined in claim 8, further comprising display means for displaying organ scan data.

11. A system for organ rendering, comprising:
    a processor;
    an imaging adapter in signal communication with the processor for receiving organ scan data indicative of an organ;
    a segmentation unit in signal communication with the processor for segmenting an outer surface of the organ; and
    a ray-casting unit in signal communication with the processor for providing a maximum intensity projection (MIP) substantially normal to the segmented outer surface for each of a plurality of rays, and for forming a ray collection by casting each of the plurality of rays from a center of the organ through the respective MIP to the segmented outer surface.

12. A system as defined in claim 11 wherein the processor renders the organ scan data as a three-dimensional (3D) image about a region of interest.

13. A system as defined in claim 12, further comprising a display adapter in signal communication with the processor for displaying the rendered 3D image.

14. A system as defined in claim 13, further comprising a user interface adapter for checking the scan quality.

15. A system as defined in claim 11 wherein the processor provides a profile for each ray and recognizes known patterns.

16. A program storage device readable by machine, tangibly embodying a program of instructions executable by the machine to perform program steps for organ rendering, the program steps comprising:
    segmenting an outer surface of an organ;
    providing a maximum intensity projection (MIP) substantially normal to the segmented outer surface for each of a plurality of rays; and
    forming a ray collection by casting each of the plurality of rays from a center of the organ through the respective MIP to the segmented outer surface.

17. A device as defined in claim 16, the program steps further comprising unfolding a three-dimensional (3D) model of the organ into a two-dimensional (2D) image in correspondence with the substantially normal MIPs.

18. A device as defined in claim 16 wherein:
    the organ is a heart; and
    the substantially normal MIPs are indicative of features comprising coronary blood vessels.

19. A device as defined in claim 16 wherein the program step of casting rays comprises applying a maximum intensity projection filter to at least one ray.

20. A device as defined in claim 16, the program steps further comprising:
    providing a profile for each ray; and
    recognizing known patterns in each profile.

21. A method as defined in claim 1 wherein the organ is a heart, the method further comprising:
    segmenting the outer surface of the heart in response to its thick myocardium muscle;
    fitting a geometrical object to the segmented outer surface in response to the maximum intensity projections; and
    rendering high-quality coronary arteries on the fitted geometrical object in response to the ray collection.

* * * * *